United States Patent
Lee et al.

(10) Patent No.: US 6,672,229 B2
(45) Date of Patent: Jan. 6, 2004

(54) LOCKDOWN STRUCTURE FOR AGRICULTURAL PARTICULATE TANK

(75) Inventors: Laurence K. Lee, Darien, IL (US); Guntis Ozers, Woodridge, IL (US)

(73) Assignee: Case, LLC, Racine, WI (US)

( * ) Notice: Subject to any disclaimer, the term of this patent is extended or adjusted under 35 U.S.C. 154(b) by 0 days.

(21) Appl. No.: 10/137,612

(22) Filed: May 2, 2002

(65) Prior Publication Data

US 2003/0205185 A1 Nov. 6, 2003

(51) Int. Cl.⁷ .............................................. A01C 7/18
(52) U.S. Cl. ...................... 111/200; 111/925; 220/562; 220/475
(58) Field of Search ................................ 220/475, 482, 220/776, 756, 562; 280/830; 111/925, 200, 52, 54, 63, 74, 75, 77

(56) References Cited

U.S. PATENT DOCUMENTS

| | | | | |
|---|---|---|---|---|
| 818,217 A | * | 4/1906 | Anderson .................... | 280/830 |
| 2,078,939 A | * | 5/1937 | Ferguson .................... | 280/838 |
| 2,517,304 A | * | 8/1950 | Greening .................... | 414/495 |
| 3,650,501 A | * | 3/1972 | Streb .......................... | 248/146 |
| 3,714,913 A | * | 2/1973 | Gandrud ...................... | 111/80 |
| 4,030,428 A | * | 6/1977 | Truax .......................... | 111/186 |
| 4,296,695 A | * | 10/1981 | Quanbeck .................. | 111/186 |
| 4,386,715 A | * | 6/1983 | Morton ........................ | 220/798 |
| 4,395,052 A | * | 7/1983 | Rash ............................ | 280/837 |
| 4,473,016 A | * | 9/1984 | Gust ............................ | 111/174 |
| 4,624,195 A | * | 11/1986 | Doering ...................... | 111/12 |
| 4,726,303 A | * | 2/1988 | Degelman et al. ............ | 111/52 |
| 5,161,473 A | | 11/1992 | Landphair et al. .......... | 111/176 |
| 5,301,848 A | * | 4/1994 | Conrad et al. .............. | 222/613 |
| 5,379,706 A | | 1/1995 | Gage et al. .................. | 111/175 |
| 5,402,741 A | * | 4/1995 | Truax et al. ................. | 111/172 |
| 5,899,420 A | * | 5/1999 | Gerardi ....................... | 248/146 |
| 6,047,652 A | | 4/2000 | Prairie et al. ............... | 111/174 |

FOREIGN PATENT DOCUMENTS

| | | | | |
|---|---|---|---|---|
| BE | 560812 | * | 5/1960 | |
| FR | 0896301 | * | 2/1945 | ................. 220/562 |

* cited by examiner

Primary Examiner—Victor Batson
(74) Attorney, Agent, or Firm—Rebecca Henkel; Brant Maurer

(57) ABSTRACT

A method and apparatus for use with a planting assembly including a first mounting member having first and second horizontally separated ends, the apparatus comprising first and second rigid support members that extend in the same direction from and substantially perpendicular to the first and second ends of the mounting member and that form first and second support surfaces, respectively, a hopper including first and second lower wall members that together define an upwardly facing cavity and form first and second downward and oppositely facing external surfaces, respectively, the external surfaces sloping downward toward a hopper opening along first and second trajectories, respectively, the hopper positioned on the support members such that the first and second external surfaces are received on the first and second support surfaces, respectively, the first external surface forming a first hopper coupler having an engaging length dimension along the first trajectory and a first locking member having a first locking coupler formed to be received by the first hopper coupler at various juxtapositions along the engaging length, the first locking member further including a first engager integrally formed with the first locking coupler and operable to lock the first locking coupler to the first support member.

25 Claims, 12 Drawing Sheets

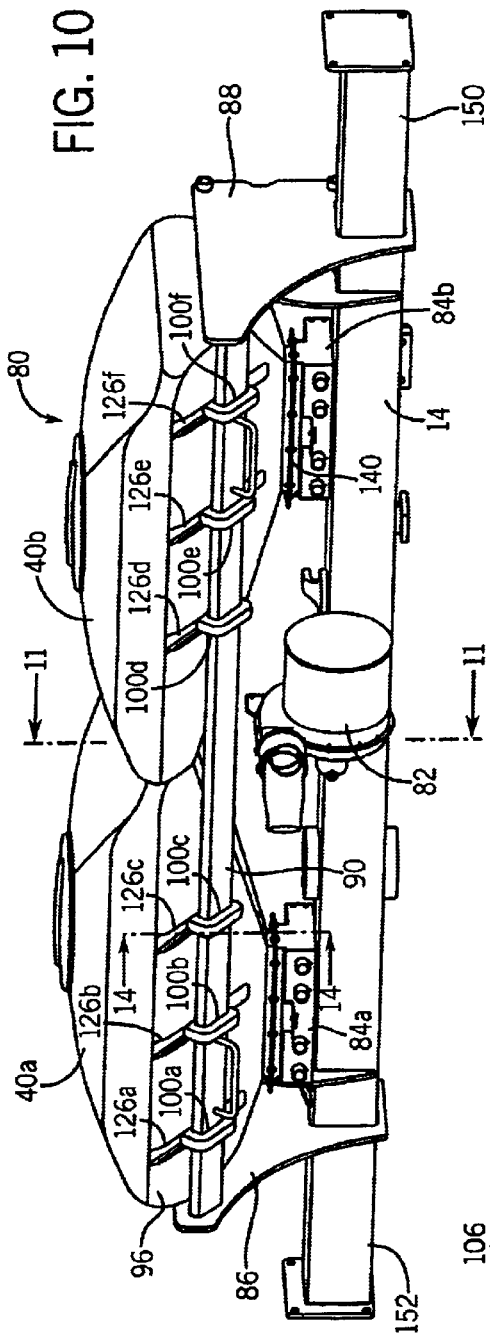
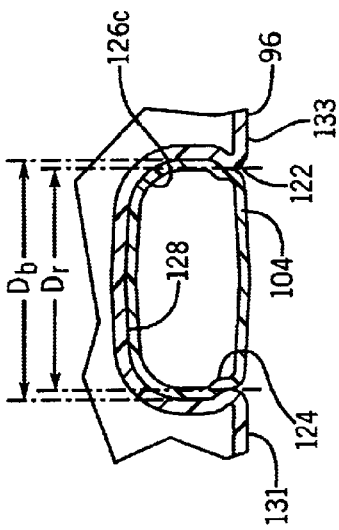
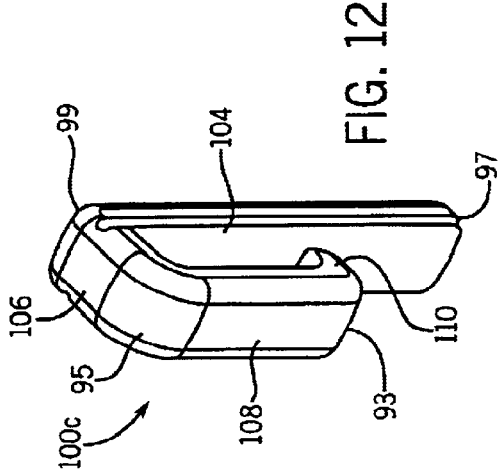

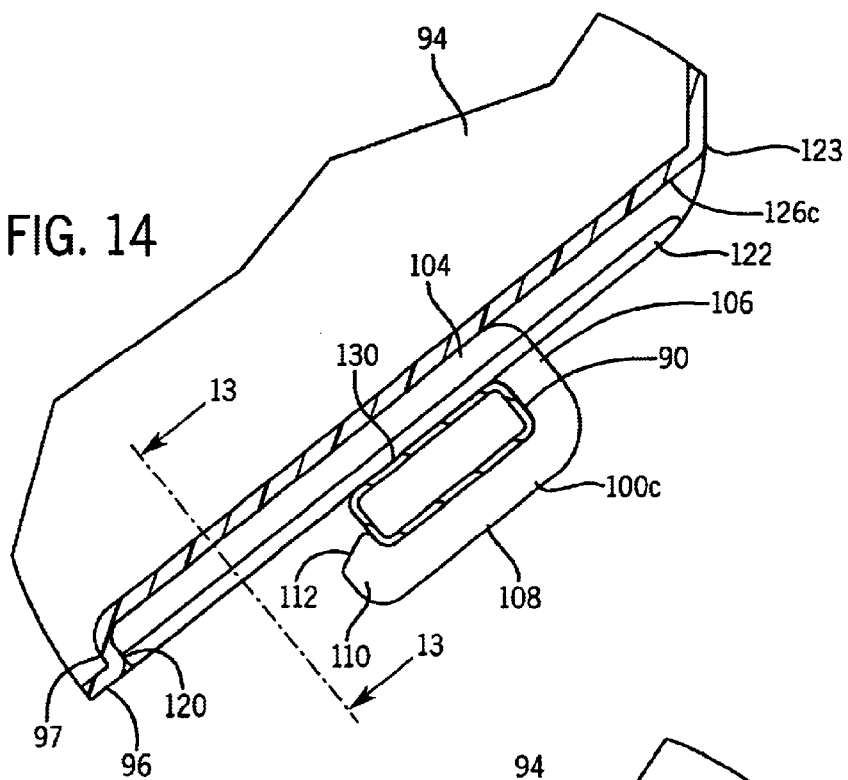
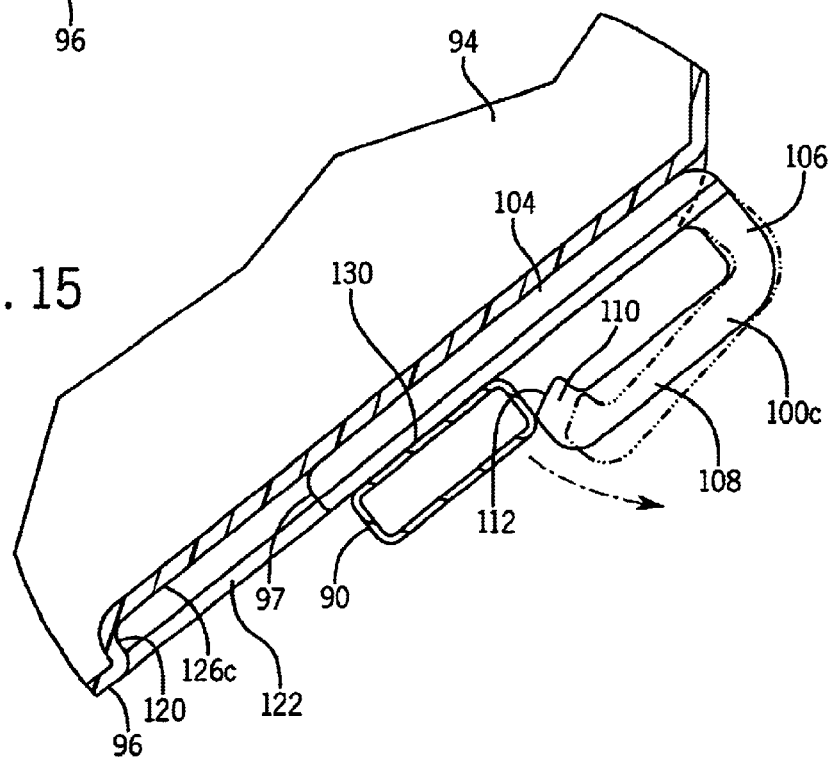

US 6,672,229 B2

LOCKDOWN STRUCTURE FOR AGRICULTURAL PARTICULATE TANK

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The present invention is related generally to agricultural implements and more specifically to an improved supporting and locking assembly for securing irregularly shaped particulate hoppers to transport assemblies.

BACKGROUND OF THE INVENTION

In the past, distribution of seed (or other particulate material such as fertilizer) for use in a variety of agricultural operations has been facilitated via a planter apparatus including a wheel supported carrier frame having a hitch for linking to a tractor or other prime mover, an implement bar mounted to the frame perpendicular to the transport direction and a plurality of row units (e.g., 8 to 32) mounted to and essentially equi-spaced along the length of the implement bar. Among other components, each row unit typically includes some type of seed bin that opens downwardly into a dispenser assembly and some type of soil agitator (e.g., a coulter or knife member) juxtaposed on the transport side of the dispenser. During transport through a field the agitator is forced through soil there below and forms a seed trench. As its label implies, the dispenser dispenses a pre-selected quantity of seed downward and behind the agitator into the trench.

The individual seed bins generally have limited storage capacity. For instance, many row unit seed bins are limited to between one and three bushel volumes. For this reason, these types of planter assemblies required frequent bin refilling. Unfortunately, seed filling stations (e.g., typically a barn or other storage unit) are typically stationary and therefore filling exercises often required a trip out of the fields back to a station and then a trip back to the fields to continue the seeding process. These filling trips increased the overall time required to plant fields. In addition to the round trip time required to refill bins, the refilling process itself was tedious as each separate row unit bin had to be filled during each filling exercise.

In an effort to reduce the number of seed refilling exercises required to seed a field, the industry has developed systems including one or more large seed reservoir hoppers mounted to the carrier frame that are transported along with the row units. In an exemplary system, a main hopper dispenses seed to a plurality of individual mini-hoppers that each, in turn, supply seed to an individual row unit. To this end, the main hopper will typically form an upwardly opening cavity and will form, among other surfaces, bottom cavity surfaces that slope downward toward an outlet port in the bottom of the hopper. The seed may be fed from the main hopper's outlet port into each mini-hopper by, for instance, entraining the seed in an air stream contained in separate, individual seed transfer hoses that are connected between the main tank and each of the individual mini-hoppers.

When designing agricultural equipment weight should be minimized to increase transport efficiency. In addition, equipment should always be designed to minimize required maintenance. Moreover, the equipment should be designed to facilitate easy configuration set up and deployment. Furthermore, as with virtually all products, manufacturing and product costs should be minimized whenever possible.

One manufacturing process that has been widely accepted for producing general purpose light weight, rugged and relatively inexpensive containers has been the rotational molding process. To form a container using a rotational molding process, the internal surfaces of a multipart metallic mold are coated with an anti-stick spray and then plastic particulate is placed inside a cavity formed by a first part of a multipart metallic mold. Thereafter other parts of the mold are secured to the first part to form a completely enclosed cavity including the particulate where the internal surface of the closed mold defines an external surface of a container to be produced. Next, the mold is heated to melt the particulate and the mold is rotated about several axis to distribute the melted particulate across the entire internal surface of the mold.

After completely covering the internal surface with melted particulate the mold is cooled and, as the mold cools, the particulate hardens to form the container. To expedite the cooling process, hot molds are often placed within cooling rooms where large fans or other types of cooling units blow cool air across the external surfaces of the molds. After cooling, when the mold is opened the container is removed and may be further processed in any of several different ways. For instance, in some cases the container may be cut in half to form a two piece container.

Because rotational molding processes are relatively inexpensive to perform and provide rugged, light weight, minimal component and often complex containers (e.g., hopper containers including variously sloped internal surfaces), rotational molding processes would appear to be nearly ideal for manufacturing main hoppers for use with planter assemblies like the assembly described above.

Unfortunately, in the case of typical rotational molding processes there are several sources or error that render it difficult to meet precise tolerances. In particular, it has been recognized that as molded containers cool, often the containers will shrink or become otherwise somewhat distorted. While shrinkage would not be problematic if the amount of shrinkage were uniform throughout a container and could be controlled, in reality shrinkage is difficult at best to control or predict.

To this end, for instance, differing cooling environments can cause similarly molded containers to have different shrinkage characteristics. For example, where first and second molds are placed in a cooling room with a fan directed at the first mold and another fan only indirectly blowing air toward the second mold, the shrinkage characteristics can be different.

As another instance, while mold rotation is attempted to evenly distribute melted particulate across the internal surfaces of the mold, sometimes distribution is uneven so that one container wall or wall section is thicker than an adjacent wall or section. In these cases, during cooling the container shape can be distorted somewhat as differently thick sections are often characterized by different cooling and shrinking characteristics. Thus, where a stiff container section is proximate a relatively thin container section the thin section may shrink more than the thick section and may be caused to distort or slightly curl about the thicker section.

As one other instance, sometimes the anti-stick spray is not evenly distributed on the internal surfaces of the mold sections so that during cooling some sections of the container may stick to the mold while other sections of the container come unstuck. Again, as in the case where particulate is unevenly distributed, some sections of the container will shrink and distort to a greater degree than other adjacent sections.

While these distortions and different shrinkage characteristics are minimal in the case of small rotational containers, unfortunately the variances become greater as the size of the container is increased. In particular, in the case of agricultural main hoppers like the ones described above where a hopper may be as large as several bushels (e.g., 30–40 bushels), the differing shrinkage and distortion characteristics may amount to as much as several inches of hopper dimension variance. For instance, where a hopper includes front and back walls, the dimension between the external surfaces of the front and back walls may vary within a range of several inches (e.g., 3–4).

One problem with hoppers having dimension variances within several inch ranges is devising a mechanism to secure such hoppers to planter transport equipment such as a wheel supported carrier frame. Generally rigid mechanical solutions for securing the hoppers to a carrier frame do not work as the variable dimensions typically cause mechanical components to misalign. For instance, assume that both the front and back ends of a hopper have to be secured to the carrier frame to provide a completely stable hopper and that the front end is bolted to the carrier frame. In this case the back end may or may not be aligned with apertures for receiving a bolt to secure the back end.

Thus, most workable hopper securing mechanisms have abandoned rigid mechanical solutions and instead have adopted strap or belt type solutions. For instance, in an exemplary belt type solution a hopper is supported in a support cradle that extends up from a carrier frame and two belt assemblies are used to secure the hopper to the support cradle. In this case each belt assembly includes two belt segments that are secured to opposite sides of the cradle with distal ends that extend up and around the top of the main hopper. The distal ends corresponding to the same belt are formed so that they can be secured together and so that the combined lengths of the corresponding belt assembly can be adjusted. Thus, importantly, because the combined lengths of each belt assembly are adjustable many different hopper dimensions can be accommodated and loose manufacturing tolerances can be tolerated.

Despite effectively securing imperfectly formed hoppers to carrier frames the belt type securing mechanisms have several shortcomings. First, such configurations require many components and therefore are relatively expensive. Second, these configurations are generally less robust than other types of rigid mechanical configurations and therefore require additional maintenance. Third, belt configurations are difficult to use. For instance, to strap a single main hopper to a support cradle, the hopper has to be positioned on the cradle, a user has to climb onto the planter assembly to access the top of the hopper, wrap a first end of a first belt around the top of the hopper, wrap a second end of the first belt around the top of the hopper and then fasten the first and second ends. Thereafter the user has to perform these tasks again, this time for the second belt assembly. Continuing, in some cases the user has to further tighten the first belt assembly and then further tighten the second assembly. This process has to be repeated for embodiments including additional hoppers.

Therefore, a need exists for a simple and inexpensive hopper support and lock down mechanism that can accommodate variously and irregularly sized hoppers.

BRIEF SUMMARY OF THE INVENTION

It has been recognized that by providing some simple coupling structure on downwardly sloping external surfaces of a hopper and locking members that engage the coupling structure and that are securable to support members, a simple, inexpensive and extremely easy to use locking and hold down structure can be configured that eliminates the problems discussed above. More specifically, where a hopper includes first and second generally oppositely facing external surfaces that face downward, the external surfaces can be constructed to form passageways that extend along trajectories that are generally parallel with the surfaces and that end at limiting surfaces that at least in part face upward. A hopper configured in this manner can be positioned between first and second substantially parallel and rigid support members that have generally upwardly facing support surfaces such that the external surfaces bear against the support surfaces.

Thereafter, locking members, each including a leg member and an integrally attached engager can be used to effectively lock the hopper to the support members. To this end, each leg member can be forced into a corresponding passageway adjacent the hopper until a distal end of the leg member is at least adjacent a corresponding limiting surface and, in some cases, actually bears downwardly against the limiting surface. The engager can then be secured to an adjacent support member to lock the engager thereto and prohibit vertical movement thereof. In this case, the distal ends restrict vertical hopper movement while the support members restrict lateral hopper movement.

It should be appreciated that the assembly described above is relatively inexpensive. This is particularly true in cases where passageways or recesses are already provided in the external hopper surfaces to add strength to the hopper walls and avoid deformation.

In addition, the assembly above is extremely inexpensive as very few components are required to configure the assembly. Moreover, the assembly is extremely easy to use. To this end, after the hopper is placed on the support members the locking members are simply inserted into corresponding passageways and the engagers are employed to complete the assembly process.

Consistent with the above discussion, the present invention includes a storage apparatus for use with a planting assembly including a first mounting member having first and second horizontally separated ends, the apparatus comprising first and second rigid support members that extend in the same direction from and substantially perpendicular to the first and second ends of the mounting member and that form first and second support surfaces, respectively, a hopper including first and second lower wall members that together define an upwardly facing cavity and form first and second downward and oppositely facing external surfaces, respectively, the external surfaces sloping downward toward a hopper opening along first and second trajectories, respectively, the hopper positioned on the support members such that the first and second external surfaces are received on the first and second support surfaces, respectively, the first external surface forming a first hopper coupler having an engaging length dimension along the first trajectory and a first locking member having a first locking coupler formed to be received by the first hopper coupler at various juxtapositions along the engaging length, the first locking member further including a first engager integrally formed with the first locking coupler and operable to lock the first locking coupler to the first support member.

In some embodiments the second external surface forms a second hopper coupler having a second engaging length dimension along the second trajectory, the apparatus further including a second locking member having a second locking coupler formed to be received by the second hopper coupler at various juxtapositions along the second engaging length, the second locking member further including a second engager integrally formed with the second locking coupler and operable to lock the second coupler to the first support member.

The first hopper coupler may include a first receiving passageway having a first length dimension aligned with the first trajectory and that extends between first and second ends where the second end is proximate a lower edge of the first external surface and is limited by a first limiting surface that at least in part faces upwardly, the second hopper coupler may include a second receiving passageway having a second length dimension aligned with the second trajectory and that extends between first and second ends where the second end of the second passageway is proximate a lower edge of the second external surface and is limited by a second limiting surface that at least in part faces upwardly, each of the locking couplers including a leg member having a distal end received within a corresponding passageway such that the distal end is proximate a corresponding limiting surface. Here, the distal ends of the leg members may abut the limiting surfaces.

In some embodiments each of the engagers includes a shoulder member that extends substantially perpendicularly from the first end of a corresponding leg member to a distal shoulder end, an arm member that extends from the distal shoulder end parallel to and to the same side of the distal end as the leg member to a distal arm end and a finger member extending from the distal arm end toward the leg member such that the leg member, shoulder member, arm member and finger member together define a support receiving space therebetween. Here, the first edges of each of the passageways may each form a lip that extends toward a corresponding opposing second edge of the passageway. In addition, the second edges of each of the passageways may each form a lip that extends toward a corresponding opposing first edge of the passageway.

In some embodiments each of the hopper couplers includes a receiving passageway that has first and second opposing edges that are substantially flush with the corresponding external surface and a basin therebetween, the basin having a basin width dimension and the first and second edges forming a restricted width dimension proximate the external surface where the basin width dimension is greater than the restricted width dimension and wherein each of the locking couplers includes a leg member having first and second leg ends and a leg width dimension that is greater than the restricted width dimension, the second end received within the corresponding basin. In at least one embodiment each of the engagers includes a shoulder member that extends substantially perpendicularly from the first end of a corresponding leg member to a distal shoulder end, an arm member that extends from the distal shoulder end parallel to and to the same side of the distal end as the leg member to a distal arm end and a finger member extending from the distal arm end toward the leg member such that the leg member, shoulder member, arm member and finger member together define a support receiving space therebetween.

The first and second passageways may have similar cross sections along their length dimensions and may be aligned with the first and second trajectories, respectively. In some embodiments the limiting surfaces are vertically below corresponding support members.

The apparatus is also for use with a planting assembly including a second mounting member having first and second horizontally separated ends where the first support member is mounted between the first ends of the first and second mounting members and the second support member is mounted between the second ends of the first and second mounting members.

The invention also includes a storage apparatus for use with a planting assembly including a main frame member, the apparatus comprising first and second mounting members mounted at opposite ends of the main frame member so as to oppose each other, the mounting members each having first and second horizontally separated ends, first and second support members that extend between and substantially perpendicular to the first ends and the second ends of the first and second mounting members, respectively, the first support member forming a first support surface that faces along a first support trajectory having an upward component and a first lateral component facing generally toward the second mounting member and the second support member forming a second support surface that faces along a second support trajectory having an upward component and a second lateral component opposing the first lateral component, a hopper including first and second lower wall members that together define an upwardly facing cavity and form first and second downward and oppositely facing external surfaces, respectively, the external surfaces sloping downward toward a hopper opening along first and second hopper trajectories, respectively, the hopper positioned on the support members such that the first and second external surfaces are received on and bear against the first and second support surfaces, respectively, the first external surface forming a first hopper coupler having a first engaging length dimension along the first trajectory, the second external surface forming a second hopper coupler having a second engaging length dimension along the second trajectory and first and second locking members, the first locking member having a first locking coupler formed to be received by the first hopper coupler at various juxtapositions along the first engaging length, the first locking member further including a first engager integrally formed with the first locking coupler and operable to lock the first locking coupler to the first support member, the second locking member having a second locking coupler formed to be received by the second hopper coupler at various juxtapositions along the second engaging length, the second locking member further including a second engager integrally formed with the second locking coupler and operable to lock the second locking coupler to the second support member.

The invention further includes a method for locking a hopper to first and second separated and substantially parallel support members that form first and second support surfaces, respectively, the hopper including first and second lower wall members that together define an upwardly facing cavity and form first and second downward and oppositely facing external surfaces, respectively, the first and second external surfaces sloping downward toward a hopper opening along first and second hopper trajectories, respectively, the method comprising the steps of providing first and second hopper couplers on the first and second external surfaces, respectively, where the first and second hopper couplers have first and second engaging length dimensions along the first and second trajectories formed to receive locking couplers at various juxtapositions there along, providing first and second locking members, the first locking member having a first locking coupler and a first engager integrally formed with the first locking coupler and operable to lock the first locking coupler to the first support member, the second locking member having a second locking coupler and a second engager integrally formed with the second locking coupler and operable to lock the second locking coupler to the second support member, placing the hopper between the support members with the first and second external surfaces bearing against the first and second support surfaces, attaching the first locking coupler to the first hopper coupler proximate the first support member, attaching the second locking coupler to the second hopper coupler proximate the second support member, securing the first engager to the first support member and securing the second engager to the second support member.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE SEVERAL VIEWS OF THE DRAWINGS

FIG. 10 is perspective view of an exemplary hopper and hopper mounting assembly according to the present invention;

FIG. 12 is a perspective view of one of the locking members of FIG. 10;

FIG. 13 is a cross-sectional view taken along the line 13—13 in FIG. 14;

FIG. 14 is a partial cross-sectional view taken along the line 14—14 of FIG. 10 illustrating an exemplary locking member in a locked position; and FIG. 15 is similar to FIG. 14 albeit illustrating an exemplary locking member in an unlocked position.

DETAILED DESCRIPTION OF THE INVENTION

Referring now to FIGS. 1 through 4, an embodiment of the present invention will be described in the context of an agricultural assembly 10 which includes a carrier frame assembly 12, a main frame assembly 69 and a planter assembly 15. As its label implies, carrier frame assembly 12 includes components configured to facilitate transport or carrying of other assembly 10 components. Similarly, as their labels imply, main frame assembly 69 includes components configured to generally support any of several different implement assemblies while planter assembly 15, includes components used to plant seeds. Main frame assembly 69 is mounted to carrier frame assembly 12 and planter assembly 15 is mounted to main frame assembly 69.

Figure 4:
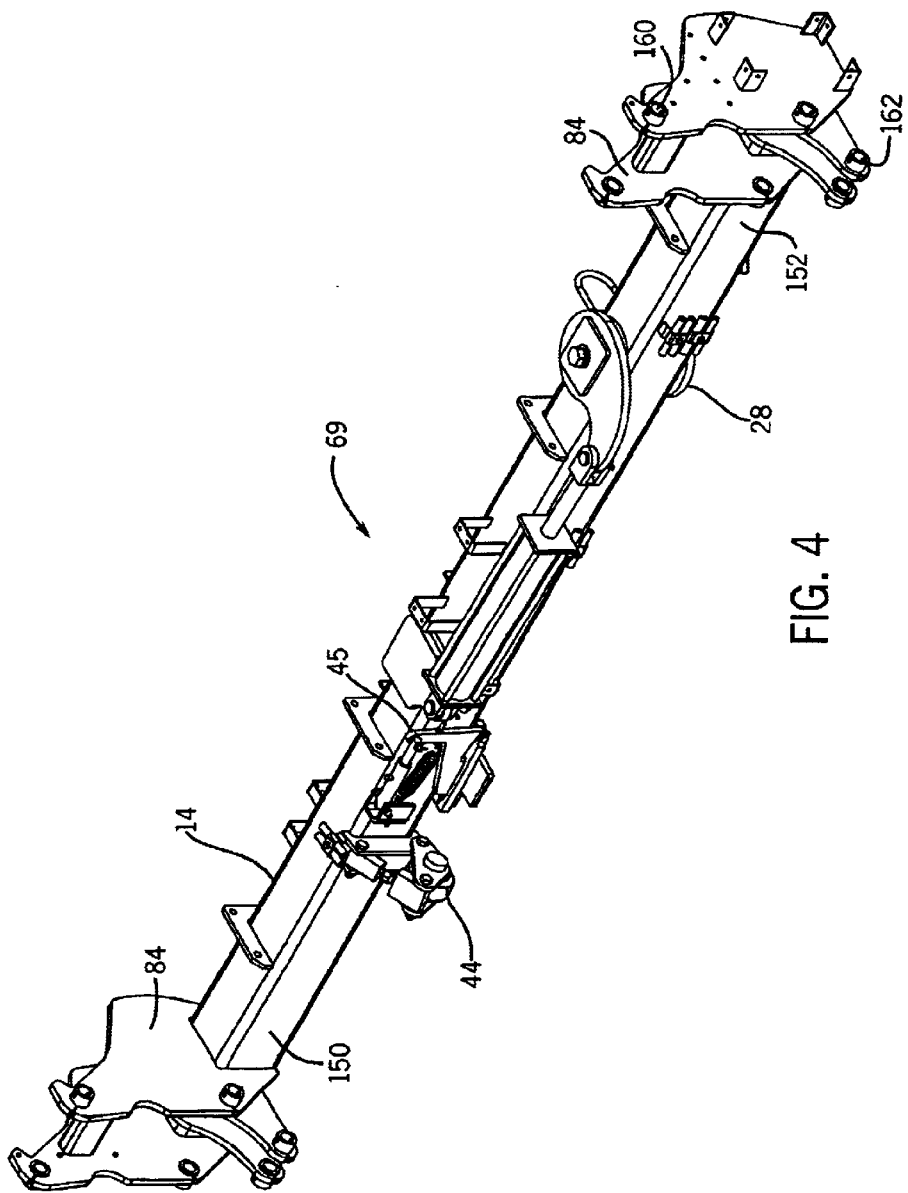
FIG. 4 is a perspective view of a mainframe assembly used with the configuration of FIG. 1.
Figure 5:
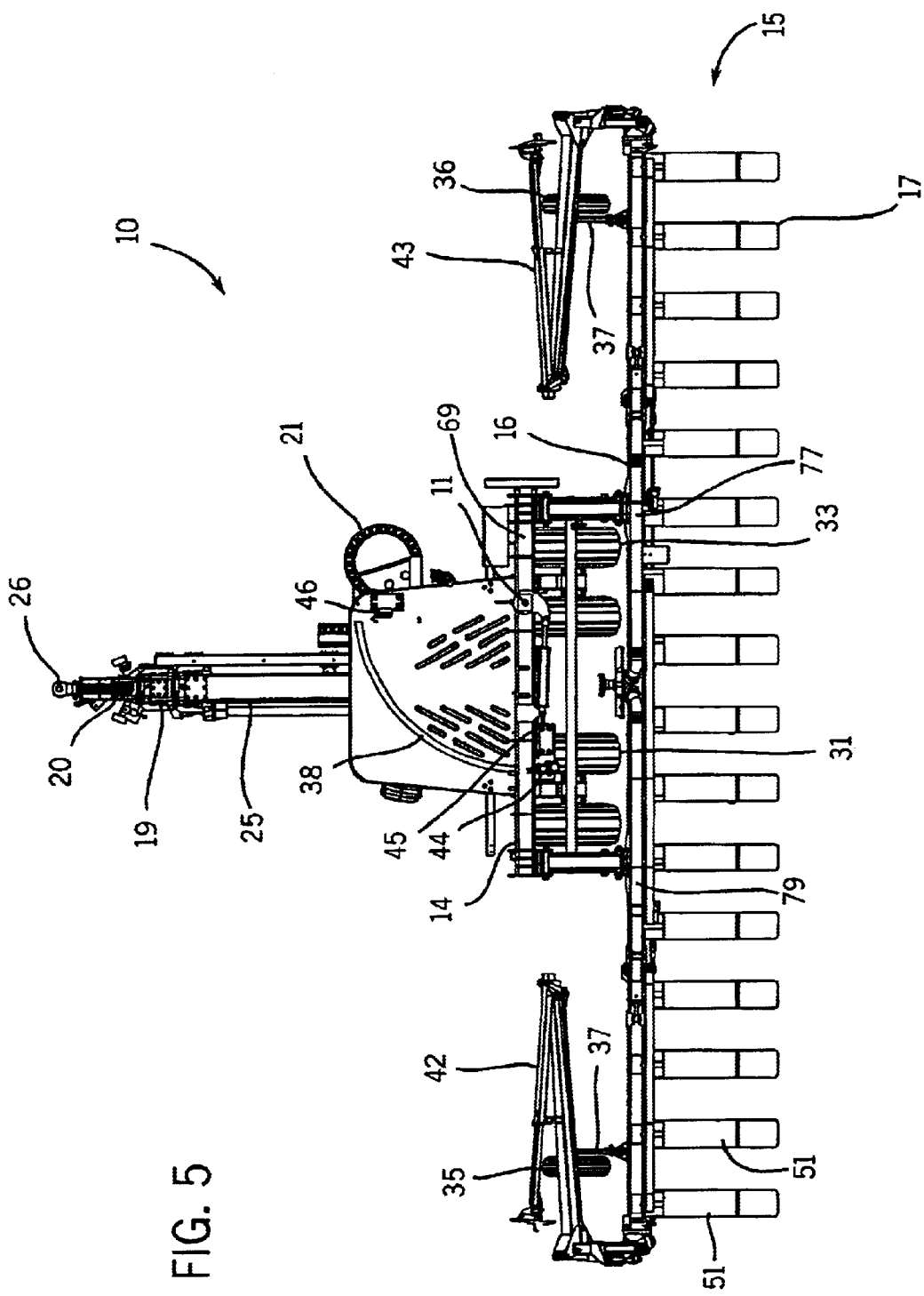
FIG. 5 is a top plan view of the embodiment of FIG. 1 in an extended operating position.

Referring still to FIGS. 1 through 4 and also to FIG. 5 (and generally to other Figures in the specification), the exemplary planter assembly 15 includes an implement bar 16, row units 17, support wheels 35, 36, wheel support members 37, extendable markers 42, 43 and a plurality of seed delivery ducts or hoses that are bundled into two delivery sheaths 77 and 79. Implement bar 16 is typically a rigid steel rectilinear bar having dimensions within the six by six to ten by ten range and extends along the length of implement assembly 15. Bar 16 is generally mounted to main frame assembly 69 in a manner described below.

Wheels 35 and 36 are mounted via wheel support members 37 at opposite ends of bar 16 and are generally positionable in two positions with respect to the ground (not illustrated). First, as illustrated in the figures, wheels 35 and 36 and/or the entire implement assembly 15 may be manipulated via hydraulic cylinders or the like such that wheels 35 and 36 are in an upright position where the wheels 35 and 36 clear the ground below. Second, wheels 35 and 36 or the entire implement assembly 15 may be manipulated such that wheels 35 and 36 contact the ground below and support the ends of the implement assembly there above with implement components either above the ground or, depending on implement type, perhaps partially engaging the ground.

Markers 42 and 43, like wheels 35 and 36, are mounted at opposite ends of bar 16 and generally extend from bar 16 to a front side (see FIGS. 1, 5, etc) of the implement assembly. Operation of markers 42 and 43 is well known in the art and therefore will not be explained here in detail. Suffice it to say markers 42 and 43 may assume either a stored position (see FIG. 5) where the markers are generally retracted or an extended and operating position (not illustrated) where the markers 42 and 43 are unfolded and extend at least in part in the direction away from units 17 and toward a tractor (not illustrated) that may be attached to assembly 10. Row units 17 and delivery sheaths 77 and 79 are described in more detail below.

Figure 6:
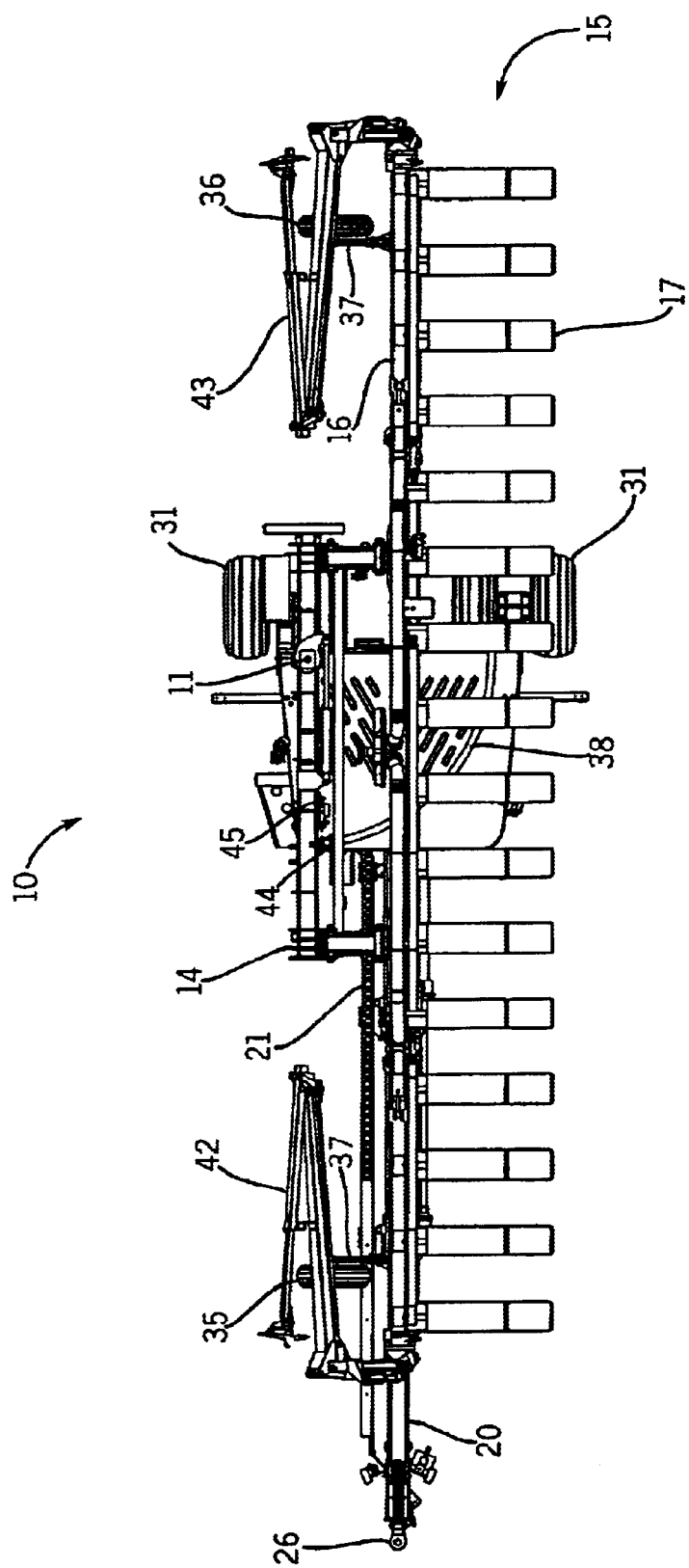
FIG. 6 is a top plan view of the embodiment of FIG. 1 in a transport position.
Figure 7:
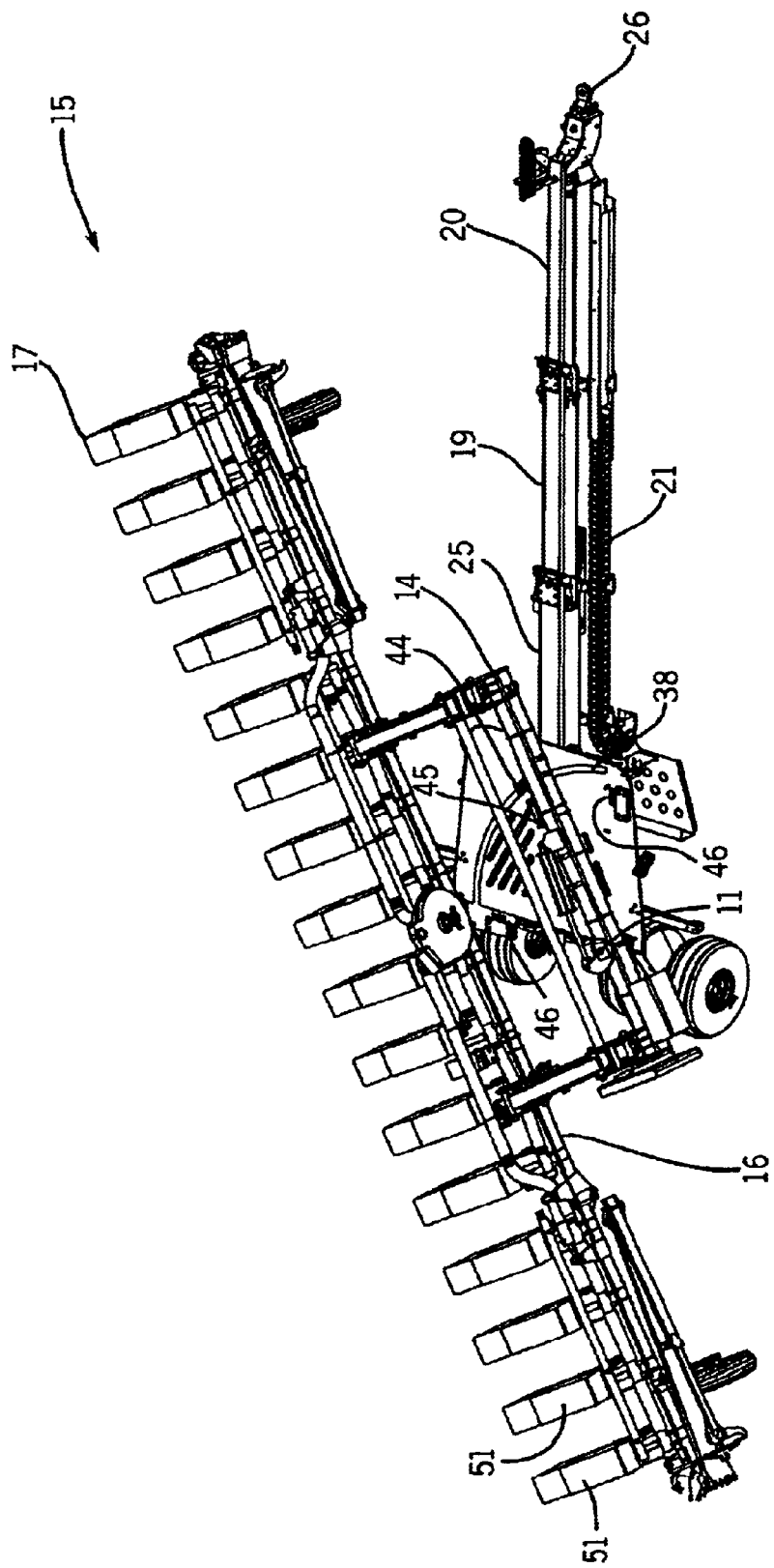
FIG. 7 is a perspective view of the embodiment of FIG. 1 in an intermediate position with an implement between the operating and the transport positions.

Referring now to FIGS. 4 and 9 through 11, the main frame assembly 69 includes, among other components, a main frame bar member 14 (also referred to as a mounting member) having first and second opposite ends 150 and 152, respectively, a roller assembly 44, a latching assembly 45, a pivot plate 28, implement mounting plates collectively identified by numeral 84 (not illustrated in FIG. 10) and a hopper and hopper support assembly 80. Pivot plate 28 is mounted to an undersurface of bar member 14 about one-fourth the length of bar member 14 from a first end thereof and forms a downwardly opening pivot receiving aperture (not observable in the Figs.) for receiving a carrier frame assembly pivot pin (see 34 in FIG. 2) which is described in more detail below. Latch assembly 45 cooperates with other system latching components (e.g., see two instances of latch 46 in FIG. 2) mounted on the carrier frame assembly 12 to lock the main frame assembly 69 and attached implement assembly 15 in either a transport position (see FIGS. 6, 8 and 9) or an operating position (see FIGS. 1 and 5). Precise configuration and operation of assembly 45 is not explained here in the interest of simplifying this explanation.

Roller assembly 44 is mounted to bar member 14 at a point about one-fourth the length of bar 14 from a second bar 14 end (not numbered) and includes at least one roller mounted for rotation in a direction substantially perpendicular to the length of bar member 14 and that is formed so as to be supportable on a track runner (e.g., 38 in FIG. 2) formed by a carrier frame platform (see platform 24 in FIGS. 2 and 3) that is explained in greater detail below. Thus, plate 28 and assembly 14 are, in the present example, essentially equi-spaced along the length of bar 14. Positioning of plate 28 and wheel assembly 44 is important to ensure proper balancing of the attached implement assembly 15 and is generally a function of how best to balance assembly 15 about a carrier assembly axis 210 (see FIG. 2).

Referring specifically to FIG. 4, implement mounting plates 84 are integrally and rigidly mounted at opposite ends 150 and 152 of bar member 14 and are fitted to receive and support implement bar 16. To this end plates 84 extend upwardly from bar 14 and each forms at least two separate pivot apertures (see 160 and 162 in FIG. 4).

Although not illustrated, assembly 10 further includes first and second lift cylinders and corresponding first and second pivoting brackets 124, 126 (see FIGS. 1 and 9) that are constructed so that opposite ends of each bracket 124, 126 are pivotally securable to mounting plates 84 and implement bar 16. The cylinders are secured at pivot apertures 160 while the brackets 124, 126 are secured at pivot apertures 162. The first and second lift cylinders each includes a rod end and a base end and opposite ends are linked to the plates 84 and the implement bar 16 such that, when the cylinders are retracted, the implement bar 16 and linked components are lowered into a functional and ground engaging position (illustrated in FIG. 1) and, when the cylinders are extended, implement bar 16 is raised into a transport and ground clearance position illustrated in FIGS. 8 and 9. When in the functional position, various components of each row unit 17 engage or at least interact with the ground there below in a manner to be described in more detail below.

Figure 1:
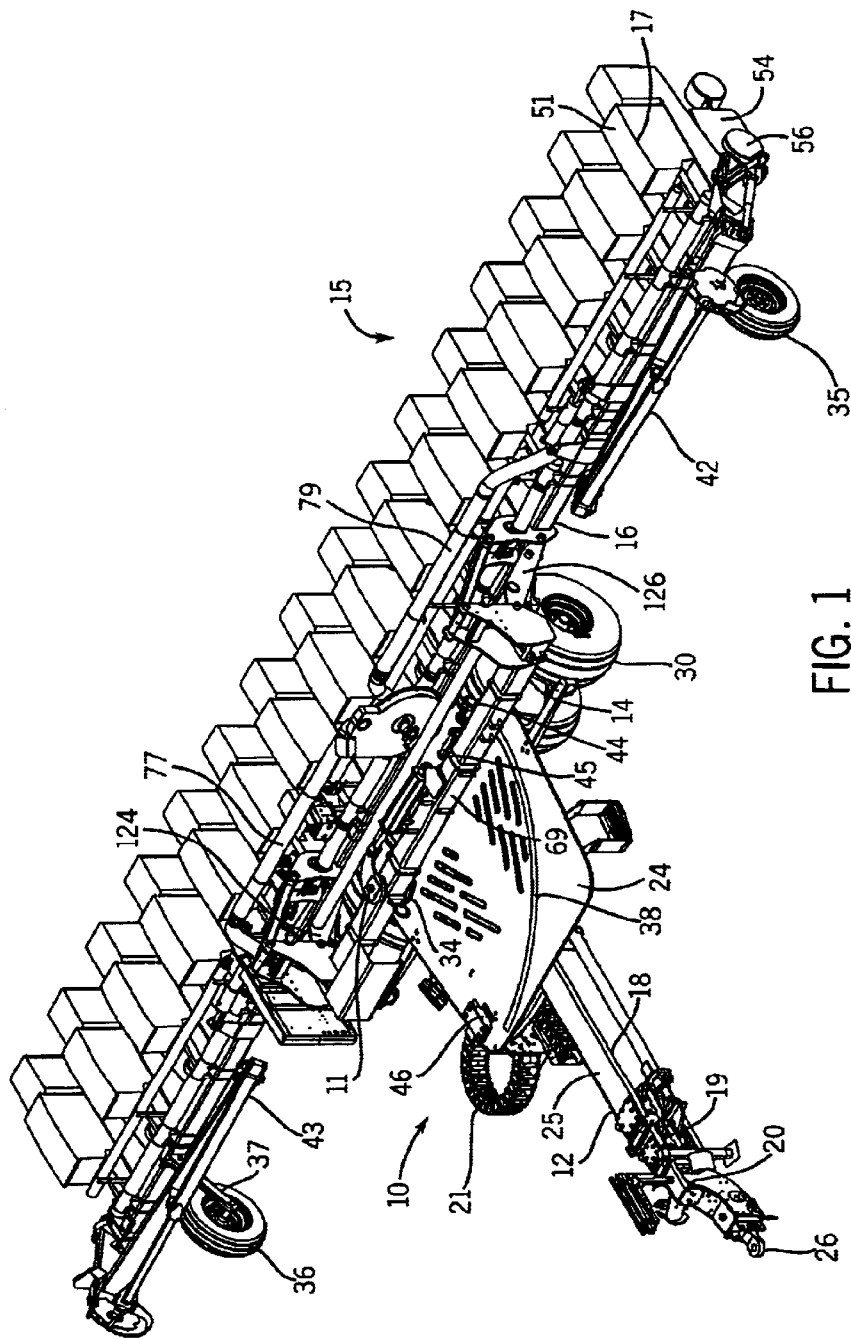
FIG. 1 is a is perspective view of a preferred embodiment of a planter apparatus constructed in accordance with one embodiment of the present invention.
Figure 2:
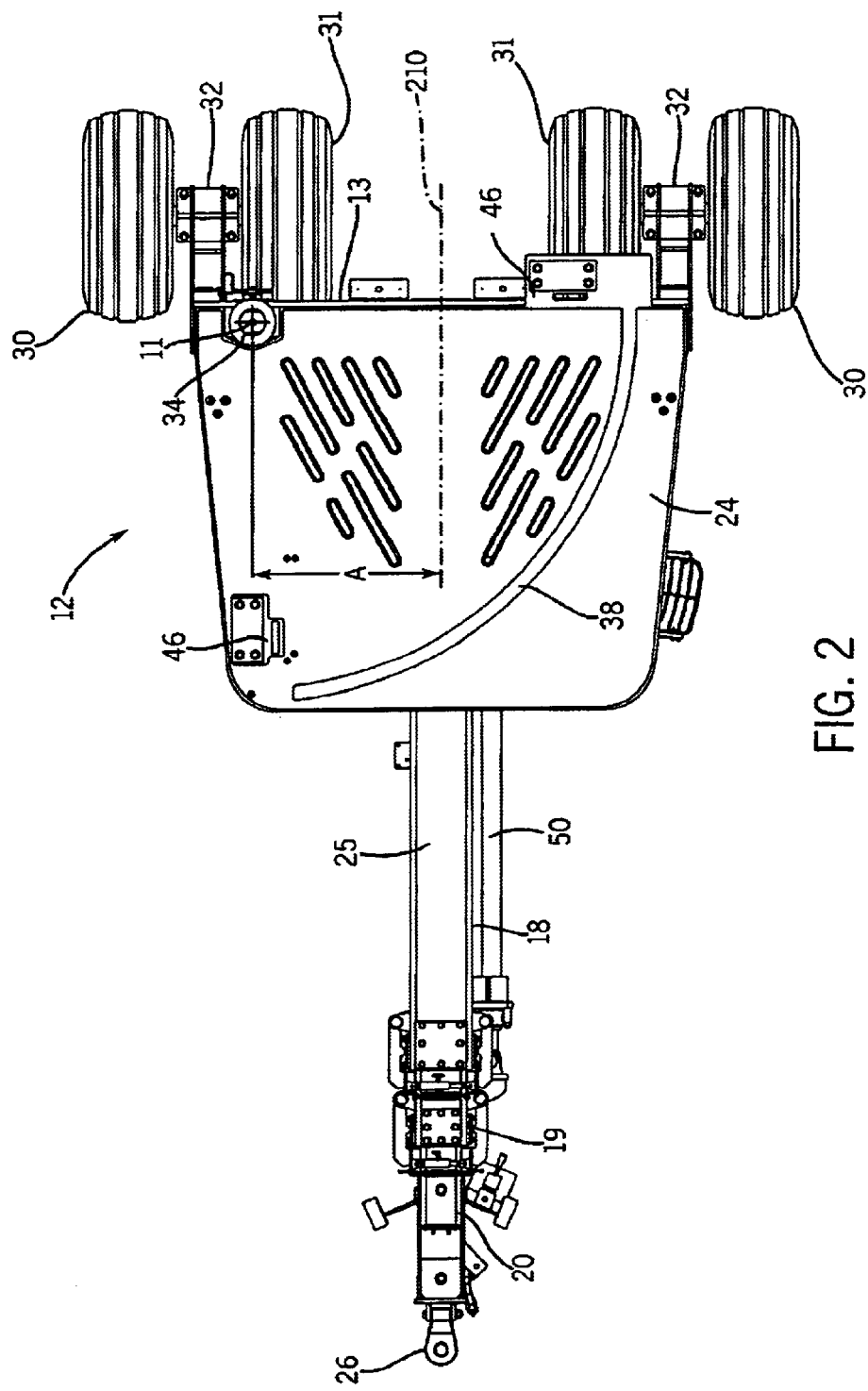
FIG. 2 is a top plan view of the carrier frame of illustrated in FIG. 1.
Figure 3:
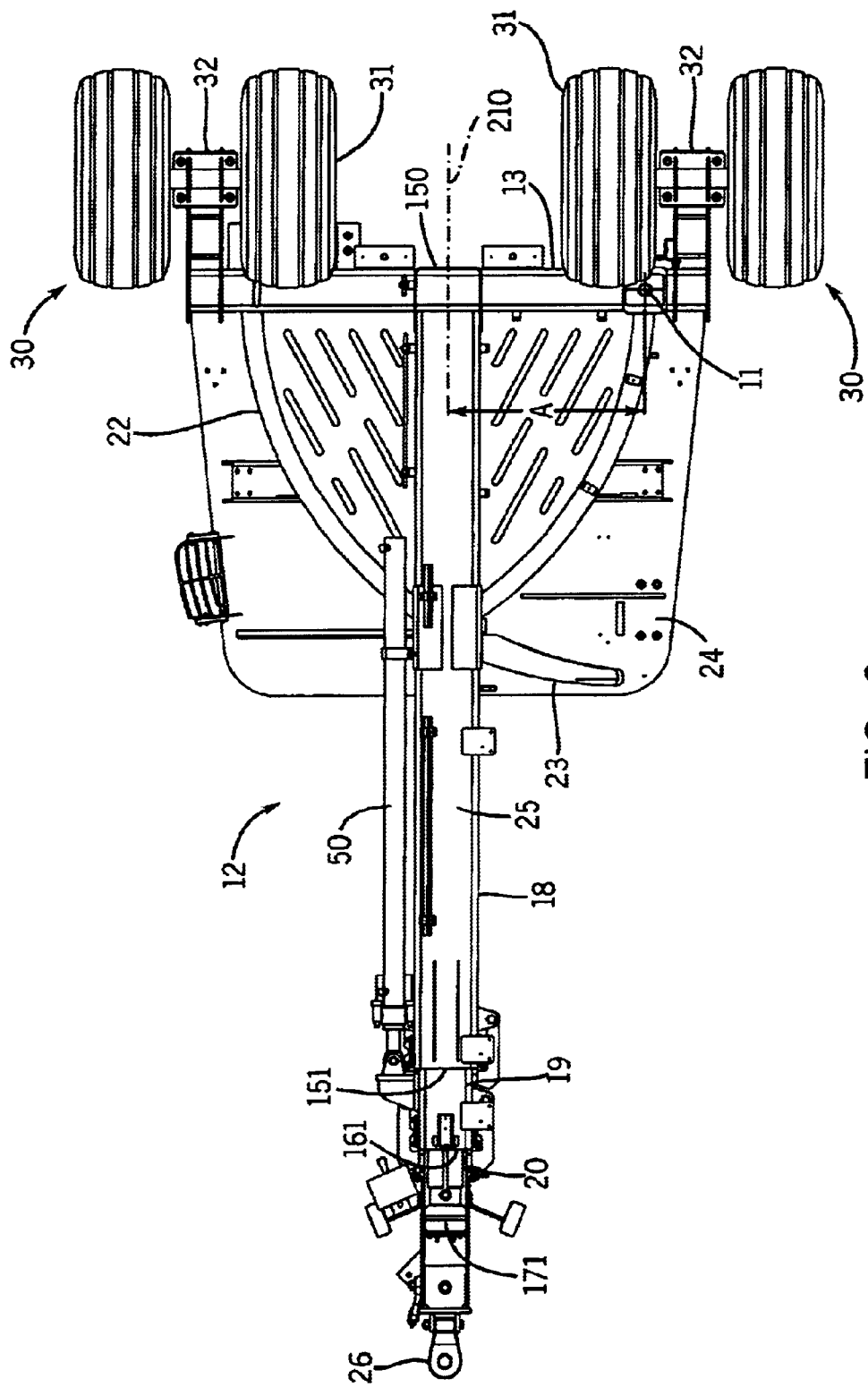
FIG. 3 is a bottom plan view of the carrier frame illustrated in FIG. 1.
Figure 8:
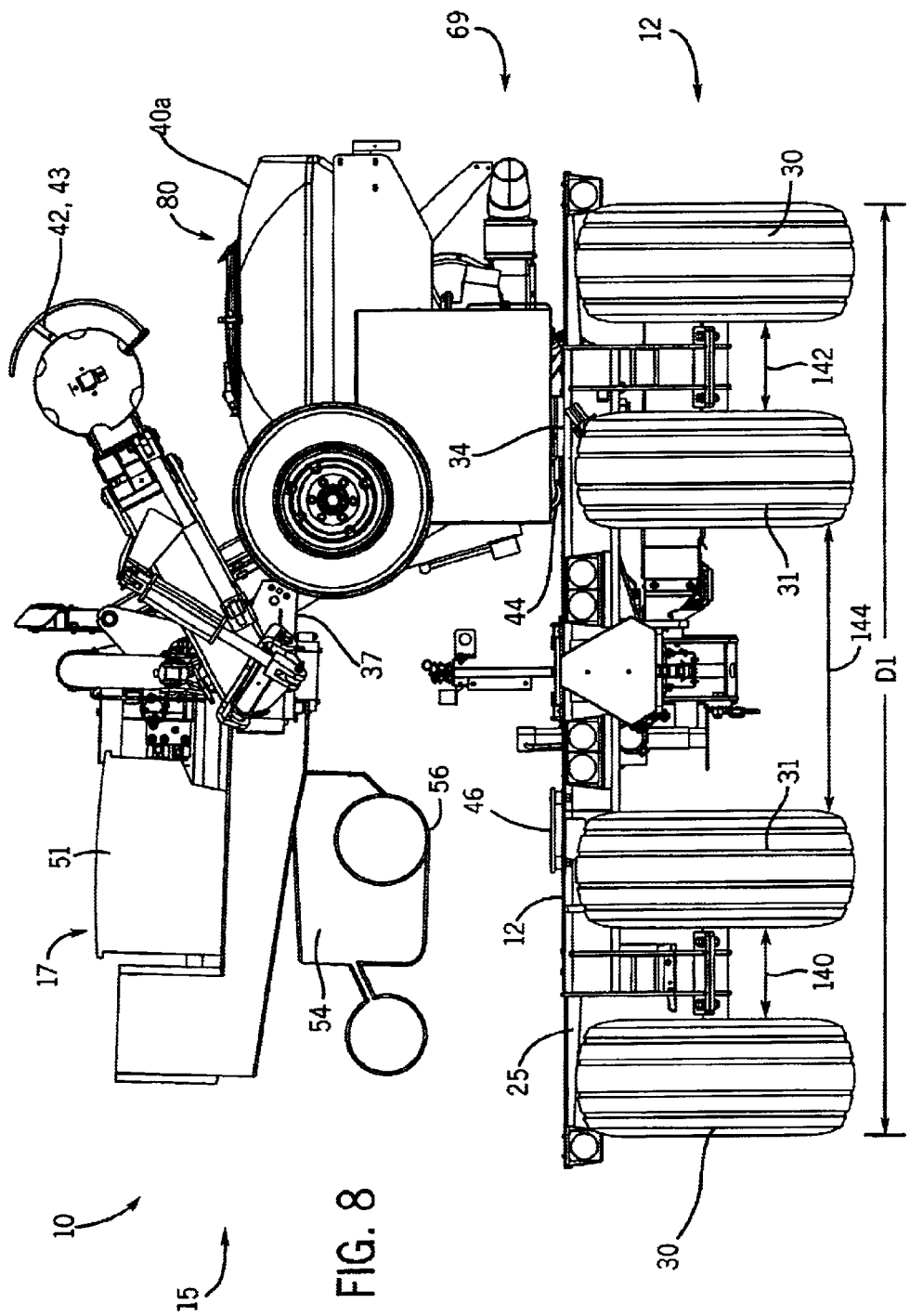
FIG. 8 is a rear perspective view of the embodiment illustrated in FIG. 1 with storage units attached and in the transport position.
Figure 9:
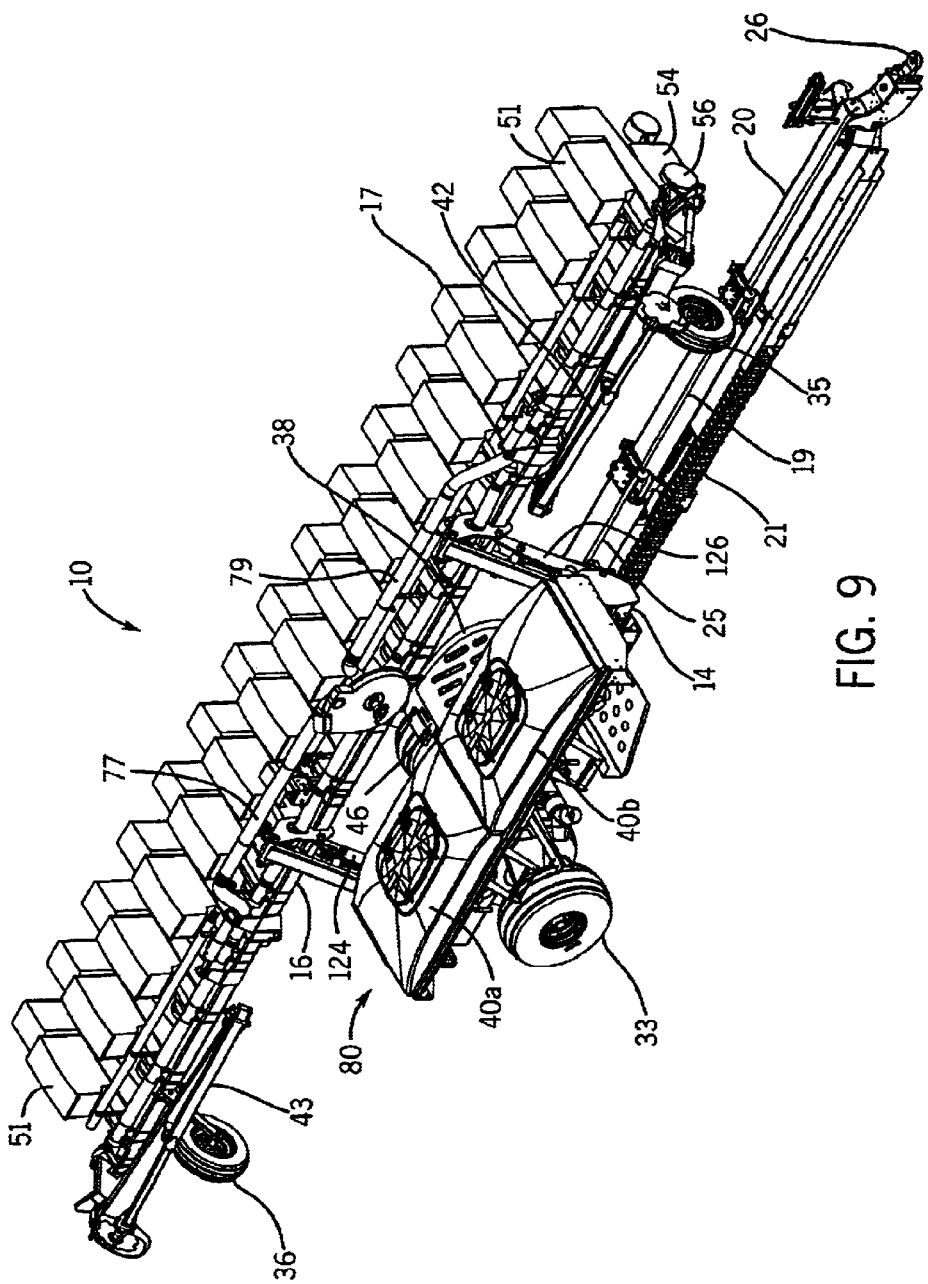
FIG. 9 is a perspective view of the embodiment of FIG. 8 with storage units in the transport position.

Referring still to FIGS. 1 and 8, exemplary assembly 10 includes sixteen row units 17 equi-spaced along the length of bar 16. As well known in the art each unit 17 includes some type of mini-hopper 51, some type of soil agitator 56 (e.g., a coulter or spade of some type) and a seed metering device 54. As their label implies, the minihoppers 51 are simply small seed hoppers or bins that reside generally near the upper portions of each row unit 17. Seed is provided to each mini-hopper by one of the seed delivery tubes bundled within one of sheaths 77 or 79.

A separate mini-hopper 51 is positioned above each row specific metering devices 54 (see FIG. 8). In addition, a separate agitator 56 is mounted to the metering devices such that the agitator is directly in front of a lower end of a corresponding metering device 54 when the assembly 10 is pulled through a field. As assembly 10 is pulled through a field, agitators 56 each form a trench into which a corresponding metering device 54 deposits seeds.

Referring to FIG. 8, support wheels 31 are separated and form spaces 140, 142, 144, etc., that, as assembly 10 is pulled through a field, travel along paths that are between crop rows being formed. Referring also to FIG. 1, row units 17 are positioned on bar 16 such that units directly behind a dimension D1 formed by the wheels 31 form rows between the wheels. For instance, one row unit 17 may be mounted to bar 16 so that a resulting row is formed within the space defined by the paths formed by the left two wheels as illustrated, another row unit 17 may be mounted to bar 16 so that a resulting row is formed within the space defined by the paths formed by the right two wheels as illustrated and perhaps two row units may be mounted to form two rows in the space between paths defined by the center wheels.

Referring now to FIG. 10, a blower assembly for pneumatically delivering seed to the mini-hoppers 51 includes, among other components, a blower or fan 82 that provides forced air to air/seed mixer units 84a and 84b that are mounted to hoppers to be described below. Blower 82 is mounted to main frame member 14 and rotates therewith and, although not illustrated, provides forced air through hoses to each of mixer units 84a and 84b which are in turn linked via hoses to the mini-hoppers 51 to deliver seed thereto.

Figure 11:
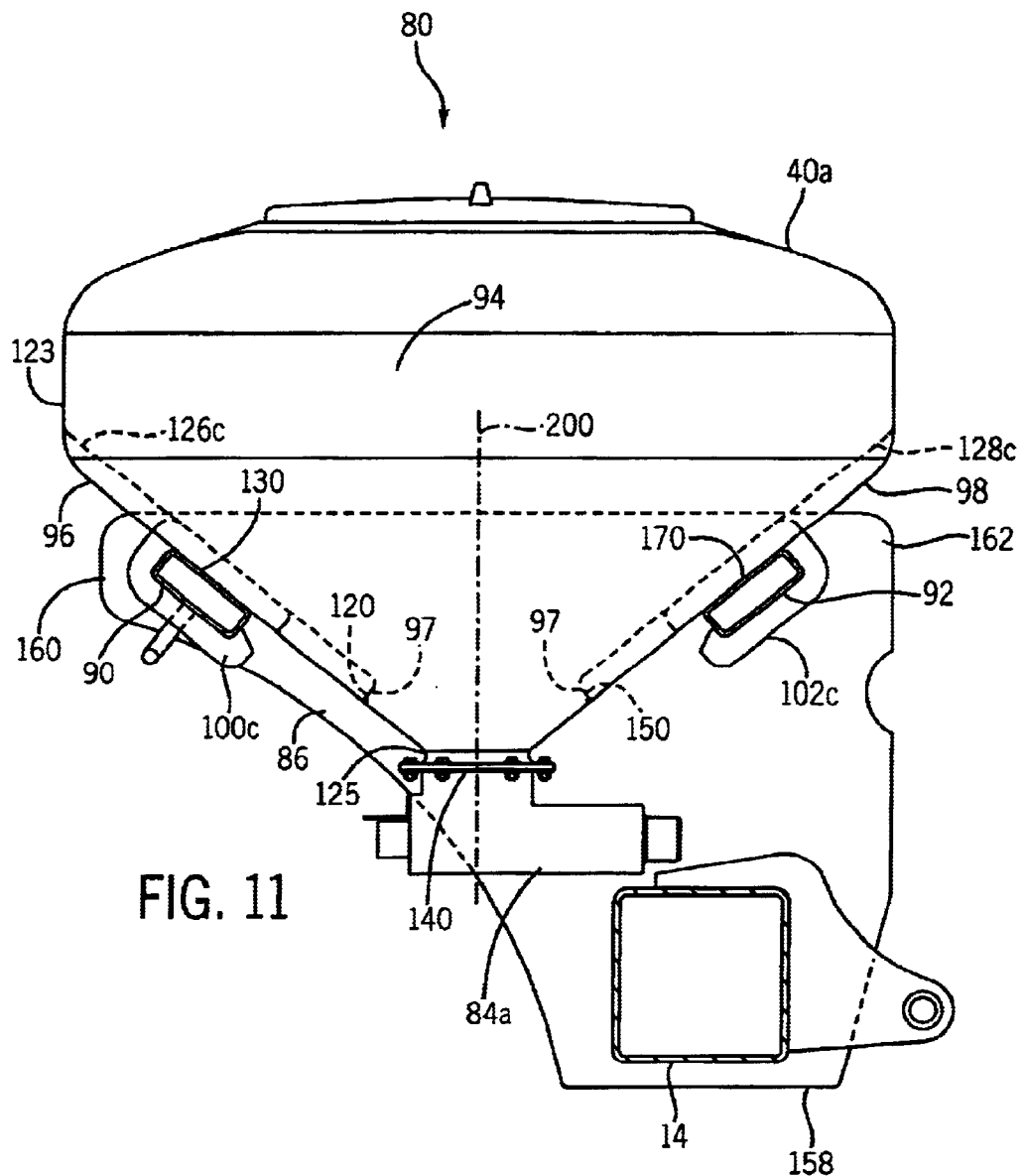
FIG. 11 is a partial cross-sectional view taken along the line 11—11 in FIG. 10.

Referring now to FIGS. 8 through 15, main hopper and hopper support assembly 80 includes first and second mounting members 86 and 88, respectively, first and second hoppers 40a and 40b, first and second support members 92 90 and 92, respectively, and a plurality of locking members including, in the illustrated example, six first locking members 100a, 100b, 100c, 100d, 100e and 100f and six second locking members 102c (only one shown). Each of the hoppers 40a and 40b is similarly constructed and operates in a similar fashion and therefore, in the interest of simplifying this explanation, only hopper 40a and components related thereto will be described in great detail. Referring specifically to FIGS. 10 and 11, hopper 40a forms an upwardly facing cavity 94 for receiving particulate therein and, among other walls and members, includes at least first and second external wall members that form external and generally downwardly and oppositely facing first and second surfaces 96 and 98 that slope downwardly toward a hopper outlet 140. When hopper 40a is in an upright position surfaces 96 and 98 form angles with respect to a vertical axis 200 that are similar in degree but of opposite sign. For instance, the angles with axis 200 formed by surfaces 96 and 98 may be −60 and +60 degrees, respectively. Mixer unit 84a is mounted at outlet 140 to receive seed therefrom.

First external surface 96 generally includes a top or upper edge 123 and a bottom or lower edge 125 and, except for a plurality of passageways (also referred to as hopper couplers) that operate as couplers, is substantially planar between edge 123 and edge 125. External surface 96 forms three passageways, 126a, 126b and 126c that are generally parallel and extend from an open top end at upper edge 123 to a bottom end formed and closed off by a limiting surface proximate bottom edge 125. Each of passageways 126a, 126b and 126c is similar and therefore only passageway 126c will be described herein detail. Referring also to FIGS. 14 and 15, passageway 126c is open at a first end adjacent edge 123 and extends toward opening 140 and ends at limiting surface 120 that at least in part faces upwardly.

Referring now to FIGS. 13 and 14, in at least one embodiment, passageway 126c defines first and second edges 131 and 133 that are substantially flush with external hopper surface 96 and includes a basin 128 therebetween. In this case, in at least one embodiment, a lip 124 may be formed along the length of passageway 126c that extends from first edge 131 toward second edge 133. Similarly, another lip 122 may be formed along the length of passageway 126c that extends from second edge 133 toward first edge 131. Within passageway 126c the basin 128 forms a basin width dimension $D_b$ which is greater than a restricted width dimension $D_r$ which is formed by the facing surfaces of lips 122 and 124.

Referring now to FIG. 11, exemplary second passageway 128c is similar to first passageway 126c and therefore will not be described here in detail. It should suffice to say that passageway 128c is formed by second external surface 98 and has a length dimension that extends along the trajectory of surface 98 toward outlet 140 and is limited by a second limiting surface 150 that is proximate outlet 140 and that at least partially faces upwardly. Although not illustrated, second external surface 98 forms two additional passageways like passageway 128c that are arranged in a fashion similar to passageways 126a, 126b and 126c on surface 96 (see FIG. 10). The second passageway 128c, like each of the first passageways and, specifically like passageway 126c as illustrated in FIG. 13, may in some embodiments include lip extensions that are flush with surface 98 and that extend along the length of the passageway 128c so that passageway 128c is also characterized by a basin width dimension $D_b$ as well as a restricted width dimension $D_r$. In addition to being useful as a coupler, the passageways are also useful to add strength to the hopper walls as well known in the art.

Referring again to FIGS. 10 and 11, each of mounting members 86 and 88 is similar in design and construction and therefore, in the interest of simplifying this explanation, only mounting member 86 will be described here in detail. Member 86 is generally triangularly shaped and includes a bottom end 158 and first and second horizontally spaced and separated ends 160 and 162, respectively. Bottom end 158 is mounted proximate main frame member end 152 with first and second ends 160 and 162 thereabove. Second mounting member 88 is mounted in a similar fashion proximate end 150 of main frame member 14. First support bar or member 90 is an elongate and rigid member that extends between the first ends (e.g. 160) of mounting members 86 and 88 and is substantially perpendicular thereto. Similarly, second support member or bar 92 is a rigid and elongate member that extends between the second ends (e.g., 162) of first and second mounting members 86 and 88 and is substantially perpendicular thereto. Each of members 90 and 92 has a rectilinear cross section and forms a generally upwardly facing support surface 130 and 170, respectively, where surfaces 130 and 170 also generally face toward each other. The angles which surfaces 130 and 170 make with respect to vertical axis 200 mirror or compliment the angles that external surfaces 96 and 98 make with respect the vertical axis such that, when hopper 40a is positioned between and so as to rest upon surfaces 130 and 170, external surfaces 96 and 98 bear against and are in substantially full contact with surfaces 130 and 170, respectively.

Referring now to FIGS. 10 and 11, each of first locking members 100a–100f and each of the second locking members like member 102c have a similar construction and operate in a similar fashion and therefore in the interest of simplifying this explanation, only member 100c will be described here in detail. Referring also to FIGS. 12 and 14, locking member 100c includes an elongated leg member 104 (also referred to as a locking coupler) and an engager including a shoulder member 106 an arm member 108 and a finger member 110. Leg member 104 is an elongated member having first and second ends 99, 97, respectively and is generally sized and shaped to be snugly receivable within passageway 126c (see also FIG. 13). The second end 97 of leg member 104 is also referred to herein as a distal end.

Shoulder member 106 extends substantially perpendicularly from first end 99 of leg member 104 to a distal end 95. Arm member 108 extends from distal end 95 substantially perpendicular thereto and in the same direction as leg member 104 and hence is substantially parallel to leg member 104. Arm member 108 extends to a distal end 93. In the illustrated embodiment, arm member 108 is approximately half as long as leg member 104. Finger member 110 extends from the distal 93 of arm member 108 toward leg member 104. A distal end of finger member 110 is sloped to form a bearing surface 112. Members 106 and 108 are dimensioned such that the space defined by members 104, 106, 108 and 110 is similar to the cross section of support member 90 so that bar 90 is snugly receivable within the space.

As best seen in FIG. 14, leg member 104 should be long enough that distal end 97 contacts limiting surface 120 when locking member 100c is in a locked position with finger member 110 wrapped around support member 90. To this end, locking members like member 100c may be provided that have variously dimensioned leg members 104 to accommodate imperfectly shaped hoppers 40a.

Generally speaking, locking member 100c is somewhat flexible at either leg member first end 99, should member distal end 95 or somewhere along the length of should member 106 while each of leg member 104 and arm member 108 may be rigid. When constructed in this fashion, as illustrated in FIG. 15, arm member 108 may be forced away from leg member 104 to allow support member 90 to be received between members 104 and 108 and between members 106 and 110.

It should be appreciated that, because of there complementary constructions, leg member 104 can be slid along passageway 126c from edge 123 until end 97 abuts end 120 as illustrated in FIGS. 14 and 15.

Locking members like member 100c may be formed of several different materials or a combination of materials. In at least one embodiment member 100c is formed of rubber such that, upon insertion of leg member 104 into a corresponding passageway (e.g. 126c), leg member 104 is compressed across its cross section and a snug reception is facilitated. In other embodiments leg member 104 may be rigid plastic and member 106 may be rubber. Other material combinations are contemplated.

With the components configured as described above and with hopper 40a positioned between and bearing against each of members 90 and 92, hopper 40a is secured to members 90 and 92 in the following manner. First, locking member 100c is positioned with the distal end 97 of leg member 104 aligned with passageway 126c. Next, member 100c is forced toward passageway 126c such that the distal end 97 of leg member 104 is received within passageway 126c as illustrated in FIG. 15. Continuing, as member 100c is forced further along the aforementioned trajectory, bearing surface 112 contacts member 90 and arm member 108 is forced outwardly away from member 104 as illustrated in phantom in FIG. 15. Eventually, member 100c is forced into the position as illustrated in FIG. 14 where the resiliency of locking member 100c forces arm member 108 back in to its unflexed position and finger member 110 wraps around support member 90 as illustrated in FIG. 14.

Continuing, the process described above is repeated for each of the locking members (e.g., 100b and 100a) corresponding to the passageways formed by first external surface 96 and is also repeated for each of the locking members (e.g., 102c in FIG. 11) corresponding to passageways formed by second external surface 98. Moreover, this process is also repeated for locking members (e.g., 100d, 100e and 100f and others) and passageways (e.g., 126d, 126e and 126f and others) corresponding to second hopper 40b.

To remove hopper 40a, as best illustrated in FIG. 14, each locking member (e.g., 100c) is removed by grasping finger member 110 and pulling that member away from leg member 104 and then pulling the locking member out of the corresponding passageway as illustrated in FIG. 15.

It should be appreciated that, after locking members are positioned and secured in the manner described above, tanks 40a and 40b are both laterally and vertically restricted. To this end, referring to FIG. 11, distal ends 97 restrict upward vertical motion of hopper 40a while support surfaces 130 and 170 restrict downward vertical motion. Similarly, surfaces 97, 130 and 170 restrict horizontal or lateral motion to the right and left as illustrated in FIG. 11.

It should also be appreciated that, referring to FIG. 13 as well as FIG. 11, the lips 122 and 124 that define restricted dimension $D_r$ likewise restrict upward vertical motion of hopper 40a. In addition, it should be appreciated that the embodiment described above can accommodate variably sized hoppers that can be supported by support members 90 and 92 and that include passageways like those described above.

It should be understood that the methods and apparatuses described above are only exemplary and do not limit the scope of the invention, and that various modifications could be made by those skilled in the art that would fall under the scope of the invention. For example, while two hoppers are illustrated clearly assemblies including other numbers of hoppers are contemplated. In addition, less or more locking members and corresponding passageways are contemplated. Moreover, some embodiments need not include the lips 122 and 124 along the passageway edges (see FIG. 13). Furthermore, where the lips 122 and 124 are relatively large some passageways need not include a limiting surface (e.g., 120) to restrict upward vertical motion as the lips themselves may restrict this motion. In addition, other mechanisms for engaging and locking to support members 90 and 92 are contemplated such as snaps, etc.

To apprise the public of the scope of this invention, the following claims are made:

What is claimed is:

1. A storage apparatus for use with a planting assembly including a first mounting member having first and second horizontally separated ends, the apparatus comprising:

first and second rigid support members that extend in the same direction from and substantially perpendicular to the first and second ends of the mounting member and that form first and second support surfaces, respectively;

a hopper including first and second lower wall members that together define an upwardly facing cavity and form first and second downward and oppositely facing external surfaces, respectively, the external surfaces sloping downward toward a hopper opening along first and second trajectories, respectively, the hopper positioned on the support members such that the first and second external surfaces are received on the first and second support surfaces, respectively, the first external surface forming a first hopper coupler having an engaging length dimension along the first trajectory, the second external surface forming a second hopper coupler having a second engaging length dimension along the second trajectory, the apparatus further including;

a first locking member having a first locking coupler formed to be received by the first hopper coupler at various juxtapositions along the engaging length, the first locking member further including a first engager integrally formed with the first locking coupler and operable to lock the first locking coupler to the first support member; and a second locking member having a second locking coupler formed to be received by the second hopper coupler at various juxtapositions along the second engaging length, the second locking member further including a second engager integrally formed with the second locking coupler and operable to lock the second coupler to the first support member, wherein each of the hopper couplers includes a receiving passageway that has first and second opposing edges that are substantially flush with the corresponding external surface and a basin therebetween, the basin having a basin width dimension and the first and second edges forming a restricted width dimension proximate the external surface where the basin width dimension is greater than the restricted width dimension and wherein each of the locking couplers includes a leg member having first and second leg ends and a leg width dimension that is greater than the restricted width dimension, the second end received within the corresponding basin.

2. The apparatus of claim 1 wherein each of the engagers includes a shoulder member that extends substantially perpendicularly from the first end of a corresponding leg member to a distal shoulder end, an arm member that extends from the distal shoulder end parallel to and to the same side of the distal end as the leg member to a distal arm end and a finger member extending from the distal arm end toward the leg member such that the leg member, shoulder member, arm member and finger member together define a support receiving space therebetween.

3. The apparatus of claim 2 wherein each of the finger members includes a tapered edge facing a corresponding leg member and away from a corresponding shoulder member.

4. The apparatus of claim 2 wherein the locking members are formed of a resilient rubber.

5. The apparatus of claim 2 wherein the first and second passageways have similar cross sections along their length dimensions and are aligned with the first and second trajectories, respectively.

6. The apparatus of claim 5 wherein the first edges of each of the passageways each forms a lip that extends toward a corresponding opposing second edge of the passageway.

7. The apparatus of claim 6 wherein the second edges of each of the passageways each forms a lip that extends toward a corresponding opposing first edge of the passageway.

8. The apparatus of claim 7 wherein each of the first and second external surfaces has an upper edge and where each of the passageways is open at a corresponding upper edge.

9. The apparatus of claim 8 wherein the first and second external surfaces include first and second lower edges, respectively, and the first and second external surfaces form first and second limiting surfaces proximate the first and second lower edges and at lower ends of the first and second passageways, respectively.

10. The apparatus of claim 9 wherein the limiting surfaces are vertically below corresponding support members.

11. A storage apparatus for use with a planting assembly including a first mounting member having first and second horizontally separated ends, the apparatus comprising:

first and second rigid support members that extend in the same direction from and substantially perpendicular to the first and second ends of the mounting member and that form first and second support surfaces, respectively;

a hopper including first and second lower wall members that together define an upwardly facing cavity and form first and second downward and oppositely facing external surfaces, respectively, the external surfaces sloping downward toward a hopper opening along first and second trajectories, respectively, the hopper positioned on the support members such that the first and second external surfaces are received on the first and second support surfaces, respectively, the first external surface forming a first hopper coupler including a first receiving passageway having a first engaging length dimension aligned with and along the first trajectory and that extends between first and second ends where the second end is proximate a lower edge of the first external surface and is limited by a first limiting surface that at least in part faces upwardly, the second external surface forming a second hopper coupler including a second receiving passageway having a second engaging length dimension aligned with and along the second trajectory and that extends between first and second ends where the second end of the second passageway is proximate a lower edge of the second external surface and is limited by a second limiting surface that at least in part faces upwardly;

a first locking member having a first locking coupler formed to be received by the first hopper coupler at various juxtapositions along the engaging length, the first locking member further including a first engager integrally formed with the first locking coupler and operable to lock the first locking coupler to the first support member; and a second locking member having a second locking coupler formed to be received by the second hopper coupler at various juxtapositions along the second engaging length the second locking member further including a second engager integrally formed with the second locking coupler and operable to lock the second coupler to the first support member, each of the locking couplers including a leg member having a distal end received within a corresponding passageway such that the distal end is proximate a corresponding limiting surface.

12. The apparatus of claim 11 wherein the distal ends of the leg members abut the limiting surfaces.

13. The apparatus of claim 12 wherein each of the engagers includes a shoulder member that extends substantially perpendicularly from the first end of a corresponding leg member to a distal shoulder end, an arm member that extends from the distal shoulder end parallel to and to the same side of the distal end as the leg member to a distal arm end and a finger member extending from the distal arm end toward the leg member such that the leg member, shoulder member, arm member and finger member together define a support receiving space therebetween.

14. The apparatus of claim 13 wherein the first edges of each of the passageways each forms a lip that extends toward a corresponding opposing second edge of the passageway.

15. The apparatus of claim 14 wherein the second edges of each of the passageways each forms a lip that extends toward a corresponding opposing first edge of the passageway.

16. A storage apparatus for use with a planting assembly including a main frame member, the apparatus comprising:

first and second mounting members mounted at opposite ends of the main frame member so as to oppose each other, the mounting members each having first and second horizontally separated ends;

first and second support members that extend between and substantially perpendicular to the first ends and the second ends of the first and second mounting members, respectively, the first support member forming a first support surface that faces along a first support trajectory having an upward component and a first lateral component facing generally toward the second mounting member and the second support member forming a second support surface that faces along a second support trajectory having an upward component and a second lateral component opposing the first lateral component;

a hopper including first and second lower wall members that together define an upwardly facing cavity and form first and second downward and oppositely facing external surfaces, respectively, the external surfaces sloping downward toward a hopper opening along first and second hopper trajectories, respectively, the hopper positioned on the support members such that the first and second external surfaces are received on and bear against the first and second support surfaces, respectively, the first external surface forming a first hopper coupler having a first engaging length dimension along the first trajectory, the second external surface forming a second hopper coupler having a second engaging length dimension along the second trajectory, wherein each of the hopper couplers includes a receiving passageway that has first and second opposing edges that are substantially flush with the corresponding external surface and a basin therebetween, the basin having a basin width dimension and the first and second edges forming a restricted width dimension proximate the external surface where the basin width dimension is greater than the restricted width dimension; and first and second locking members, the first locking member having a first locking coupler formed to be received by the first hopper coupler at various juxtapositions along the first engaging length, the first locking member further including a first engager integrally formed with the first locking coupler and operable to lock the first locking coupler to the first support member, the second locking member having a second locking coupler formed to be received by the second hopper coupler at various juxtapositions along the second engaging length, the second locking member further including a second engager integrally formed with the second locking coupler and operable to lock the second locking coupler to the second support member, wherein each of the locking couplers includes a leg member having first and second leg ends and a leg width dimension that is greater than the restricted dimension, the second end received within the corresponding basin, each of the engagers includes a shoulder member that extends substantially perpendicularly from the first end of a corresponding leg member to a distal shoulder end, an arm member that extends from the distal shoulder end parallel to and to the same side of the distal end as the leg member to a distal arm end and a finger member extending from the distal arm end toward the leg member such that the leg member, shoulder member, arm member and finger member together define a support receiving space therebetween.

17. The apparatus of claim 16 wherein the first edges of each of the passageways each forms a lip that extends toward a corresponding opposing second edge of the passageway and the second edges of each of the passageways each forms a lip that extends toward a corresponding opposing first edge of the passageway.

18. The apparatus of claim 17 wherein the first and second external surfaces have first and second upper edges and first and second lower edges, respectively, and where each of the passageways is open at a corresponding upper edge and the first and second external surfaces form first and second limiting surfaces proximate the first and second lower edges and at lower ends of the first and second passageways, respectively.

19. The apparatus of claim 18 wherein the limiting surfaces are vertically below corresponding support members and the leg members have lengths such that distal ends of the legs are proximate corresponding limiting surfaces when the leg members are received in corresponding basins.

20. A storage apparatus for use with a planting assembly including a first mounting member having first and second horizontally separated ends, the apparatus comprising:

first and second rigid support members that extend in the same direction from and substantially perpendicular to the first and second ends of the mounting member and that form first and second support surfaces, respectively;

a hopper including first and second lower wall members that together define an upwardly facing cavity and form first and second downward and oppositely facing external surfaces, respectively, the external surfaces sloping downward toward a hopper opening along first and second trajectories, respectively, the hopper positioned on the support members such that the first and second external surfaces are received on the first and second support surfaces, respectively, the first external surface forming a first hopper coupler including a first receiving passageway having an engaging length dimension along the first trajectory; and a first locking member having a first locking coupler formed to be received by the first receiving passageway of the first hopper coupler at various juxtapositions along the engaging length, the first locking member further including a first engager integrally formed with the first locking coupler and operable to lock the first locking coupler to the first support member.

21. The apparatus of claim 20 wherein the second external surface forms a second hopper coupler including a second receiving passageway having a second engaging length dimension along the second trajectory, the apparatus further including a second locking member having a second locking coupler formed to be received by the second receiving passageway of the second hopper coupler at various juxtapositions along the second engaging length, the second locking member further including a second engager integrally formed with the second locking coupler and operable to lock the second coupler to the first support member.

22. The apparatus of claim 20 also for use with a planting assembly including a second mounting member having first and second horizontally separated ends where the first support member is mounted between the first ends of the first and second mounting members and the second support member is mounted between the second ends of the first and second mounting members.

23. A storage apparatus for use with a planting assembly including a first mounting member having first and second horizontally separated ends, the apparatus comprising:

first and second rigid support members that extend in the same direction from and substantially perpendicular to the first and second ends of the mounting member and that form first and second support surfaces, respectively;

a hopper including first and second lower wall members that together define an upwardly facing cavity and form first and second downward and oppositely facing external surfaces, respectively, the external surfaces sloping downward toward a hopper opening along first and second trajectories, respectively, the hopper positioned on the support members such that the first and second external surfaces are received on the first and second support surfaces, respectively, the first external surface forming a first hopper coupler having an engaging length dimension along the first trajectory, the first hopper coupler including a plurality of first hopper couplers spaced along the first external surface; and a first locking member, the first locking member including a separate first locking member for each of the first hopper couplers and a first locking coupler formed to be received by the first hopper coupler at various juxtapositions along the engaging length, the first locking member further including a first engager integrally formed with the first locking coupler and operable to lock the first locking coupler to the first support member.

24. The apparatus of claim 23 wherein the second external surface forms a second hopper coupler including a second receiving passageway having a second engaging length dimension along the second trajectory, the second hopper coupler further including a plurality of second hopper couplers spaced along the second external surface, the apparatus further including a second locking member, the second locking member including a separate second locking member for each of the second hopper couplers and a second locking coupler formed to be received by the second hopper coupler at various juxtapositions along the second engaging length, the second locking member further including a second engager integrally formed with the second locking coupler and operable to lock the second coupler to the first support member.

25. A method for locking a hopper to first and second separated and substantially parallel support members that form first and second support surfaces, respectively, the hopper including first and second lower wall members that together define an upwardly facing cavity and form first and second downward and oppositely facing external surfaces, respectively, the first and second external surfaces sloping downward toward a hopper opening along first and second hopper trajectories, respectively, the method comprising the steps of:

providing first and second hopper couplers on the first and second external surfaces, respectively, where the first and second hopper couplers include first and second receiving passageways having first and second engaging length dimensions along the first and second trajectories formed to receive locking couplers at various juxtapositions therealong;

providing first and second locking members, the first locking member having a first locking coupler and a first engager integrally formed with the first locking coupler and operable to lock the first locking coupler to the first support member, the second locking member having a second locking coupler and a second engager integrally formed with the second locking coupler and operable to lock the second locking coupler to the second support member;

placing the hopper between the support members with the first and second external surfaces bearing against the first and second support surfaces;

attaching the first locking coupler to the first receiving passageway of the first hopper coupler proximate the first support member;

attaching the second locking coupler to the second receiving passageway of the second hopper coupler proximate the second support member;

securing the first engager to the first support member; and securing the second engager to the second support member.

* * * * *